April 28, 1964 W. L. SANBORN ETAL 3,130,909
SPRAYING EQUIPMENT
Filed Feb. 12, 1960 7 Sheets-Sheet 1

Inventors
William L. Sanborn
Earl J. Senninger
By Mann, Brown & McWilliams
Attorneys April 28, 1964  W. L. SANBORN ETAL  3,130,909
SPRAYING EQUIPMENT
Filed Feb. 12, 1960  7 Sheets-Sheet 2

Inventor
William L. Sanborn
Earl J. Senninger
By Mann, Brown & McWilliams
Attorneys

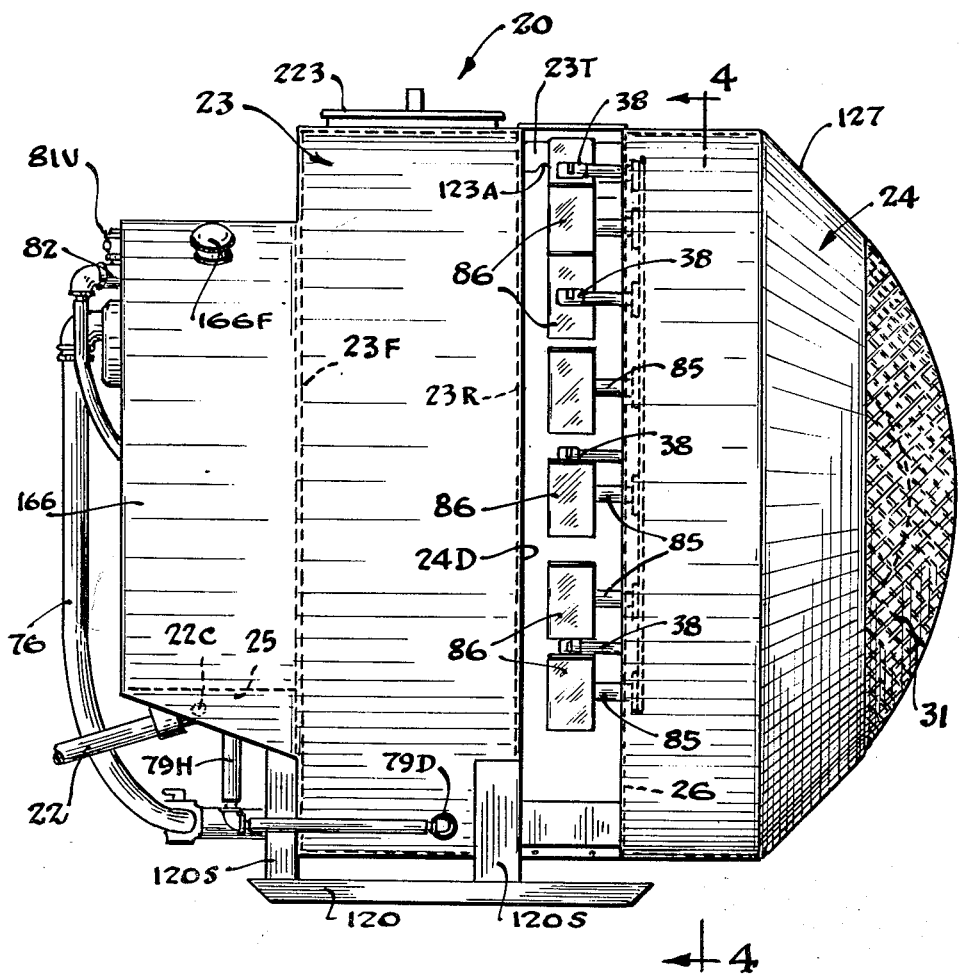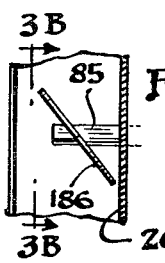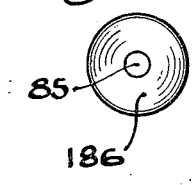

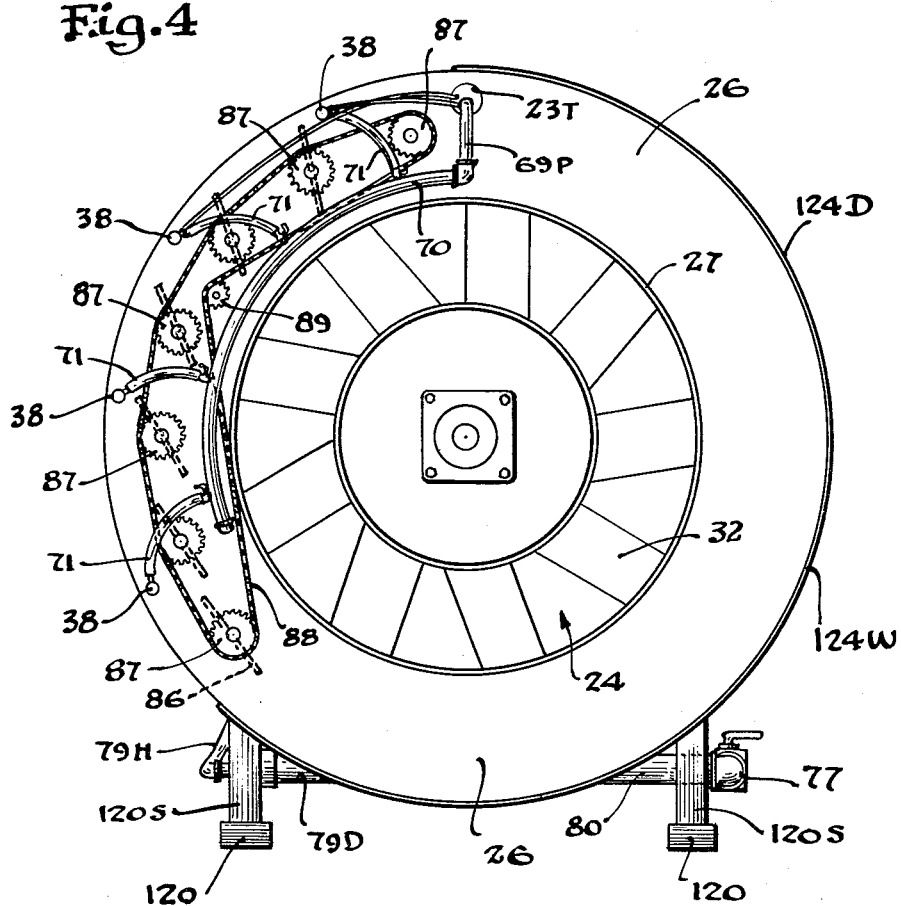

April 28, 1964 W. L. SANBORN ETAL 3,130,909
SPRAYING EQUIPMENT
Filed Feb. 12, 1960 7 Sheets-Sheet 5
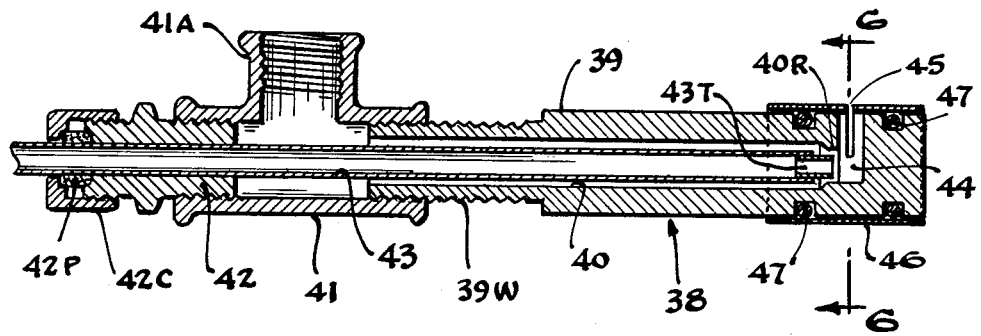
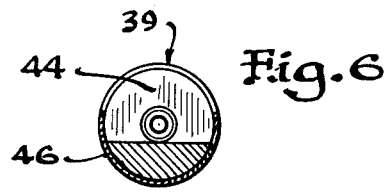
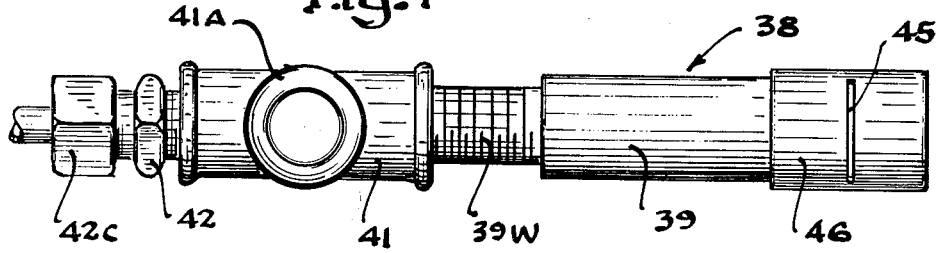
Inventor
William L. Sanborn
Earl J. Senninger
By Mann, Brown & McWilliams
Attorneys

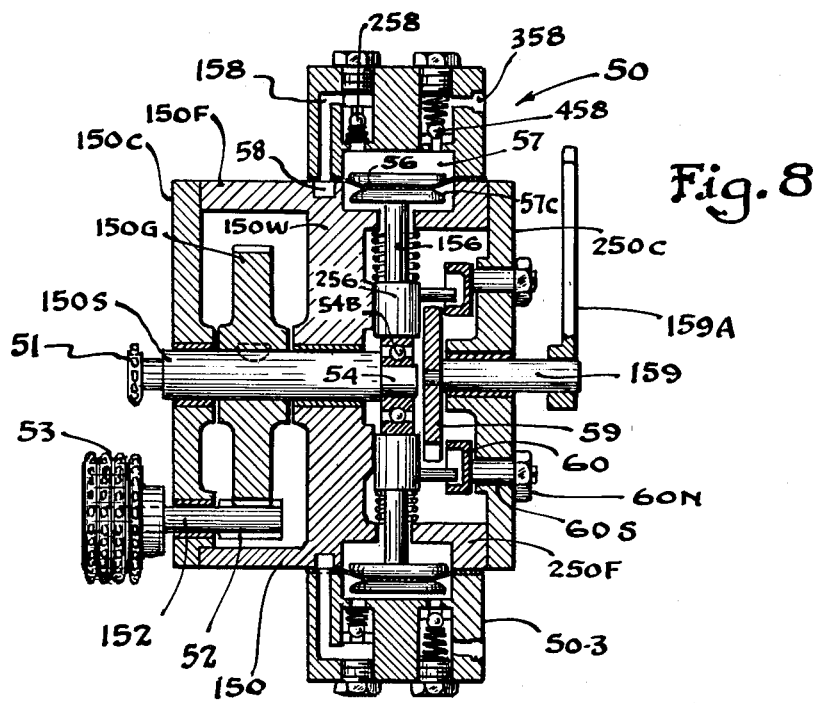
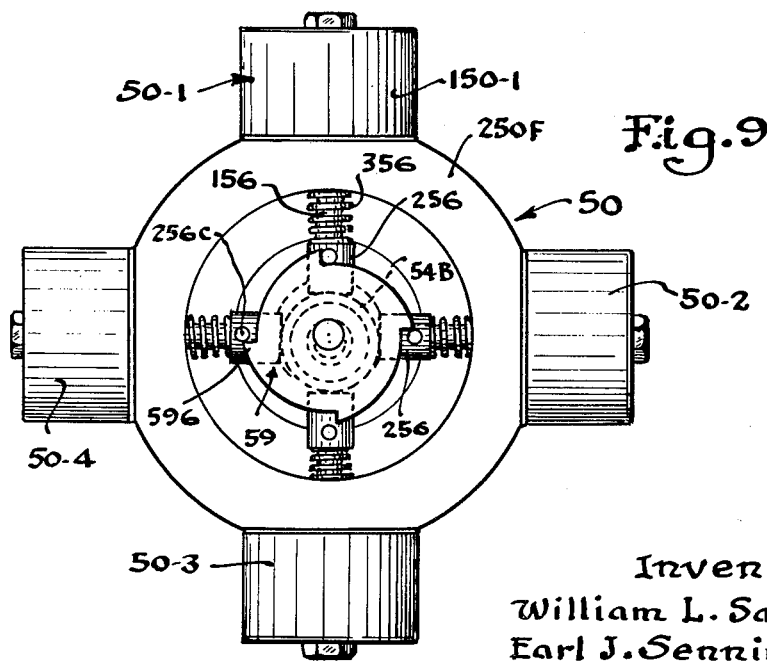

April 28, 1964   W. L. SANBORN ETAL   3,130,909
SPRAYING EQUIPMENT
Filed Feb. 12, 1960   7 Sheets-Sheet 7

Inventors
William L. Sanborn
Earl J. Senninger
By Mann, Brown & McWilliams
Attorneys United States Patent Office 3,130,909
Patented Apr. 28, 1964

3,130,909
SPRAYING EQUIPMENT
William L. Sanborn, Milwaukee, Wis., and Earl J. Senninger, Orlando, Fla., assignors, by mesne assignments, to International Telephone and Telegraph Corporation, New York, N.Y., a corporation of Maryland
Filed Feb. 12, 1960, Ser. No. 8,260
12 Claims. (Cl. 239—78)

This invention relates to spraying of trees, row crops and the like, and particularly to power-operated mobile spray apparatus wherein the spray material is carried into the desired spray pattern by a high velocity carrier air blast.

In the spraying of crops, orchards and the like, the equipment has gradually developed into an extremely large and costly form adapted to be drawn through orchards, fields and the like by tractors and arranged to apply this spray material by an air blast that serves as a carrier for the finely divided spray.

In practice, it has developed particularly in respect to the spraying of trees in orchards, that the spraying apparatus is advanced or drawn through the space between the rows of trees at a constant speed in the neighborhood of 1½ m.p.h., and although this speed is varied considerably to meet varying conditions such as differences in the size, form or density of the trees, it is considered by many users to be the speed best adapted to obtain proper coverage of the spray on the trees. In some instances speeds as low as one mile per hour have been recommended, and are used, but for illustrative purposes herein, the discussion and examples will be confined to speeds of 1½ miles per hour.

The spray materials that are used vary considerably in character according to the purpose for which the materials are applied, so that the material may constitute mixture of water with spraying oil or liquid chemicals of different kinds, or may constitute mixtures of water with powdered chemicals. In the use of spray mixtures comprising water and dry powdered chemicals, it has been the general practice to use what are called dilute spraying mixtures, and it is upon the basis of such dilute mixtures that most of the agricultural and horticultural standards for spraying have been based. In such dilute mixtures it is customary to mix, for example, about two pounds of the spray chemical with one hundred gallons of water, and with these dilute mixtures, it has been found in prior sprayers that the material may be pressure-atomized through nozzles that have spray orifices sufficiently small to break the liquid spray material into reasonably fine drops or particles that may be carried to and distributed on the leaves and fruit of a tree by means of a carrier air blast within which the several nozzles of the spraying apparatus are disposed.

It has long been recognized that such dilute sprays call for the use of an extremely large volume of water for each tree, and although initially distributed quite well on the leaves, limbs and fruit of a tree, these dilute sprays will immediately start to run off of the surfaces on which it has been deposited so that by the time the water has evaporated, the coating of chemical on the fruit, leaves or other parts of the tree is not uniform. This run off or "washdown," as it is termed in the fruit growing areas, has other objectionable effects, one of which is that no work can be performed under the trees until the dripping of liquid has subsided. This period may be as much as an hour in many instances. Another objectionable result is that a large proportion of the spray chemical is drained off of the surfaces of the tree and dropped to the ground. This loss of chemical runs to about 30% in many instances, and represents a loss of money, and in addition, such chemical often modifies the chemical composition of the soil under the trees so that corrective treatments must be applied to the soil in order to restore the desired fertility thereof.

The extremely high water requirements involved in the use of such dilute sprays is also considered to be objectionable and is quite costly in that it increases the size and weight of the tanks that must be used in the equipment, involves considerable loss of operating time for the equipment in refilling operations, and requires water-hauling equipment and labor that constitute a major element of the cost of spraying orchards and the like with such dilute sprays.

In the use of dilute sprays in the spraying of orchards, where the speed of the equipment is to be approximately 1½ m.p.h., it is customary, as an example, to apply about one pound of chemical per minute, so that with a dilute spray that uses two pounds per one hundred gallons of water contained in the usual spray supply tank of five hundred gallon capacity, the entire contents of such five hundred gallon tank is exhausted in about ten minutes of actual spraying time. It is then necessary to refill the tank and to introduce and mix the chemicals required before the spraying operation can be continued.

With prior equipment that has been used to apply dilute spray mixtures, the necessity for utilizing such a high proportion of water in the mixture has of course increased the amount of carrier air that is required to transport the atomized spray mixture from the spray nozzles to the trees or crops, and this has necessitated the use of high capacity, high discharge velocity fans and the like. It is customary to employ air velocities in the carrier air of about seventy to ninety miles per hour and to vary the direction of this carrier air so as to produce twisting and turning movements of the leaves and fruit, and this causes spray coverage of all sides of the leaves and fruits. With conventional spray equipment spraying dilute spray mixtures at the rate above mentioned, the required fan output capacity has in many instances, been from seventy to eightly thousand cubic feet per minute. This has imposed extremely great power requirements for such spraying apparatus, and in addition to this, the spray mixture has been fed to the pressure-atomization nozzles at extremely high pressures of from one hundred to six hundred pounds per square inch, so that pumps of an expensive type were necessary and a great deal of power has been required for pressurizinz the spray mixture.

Thus, the high power requirements, which made it necessary to employ separate engines for the fan and the pressure pumps, taken with the high capacity of the fans employed in prior equipment, and the necessity for using a large tank to contain the spray mixture, have resulted in prior spray equipment being extremely large and heavy, and the initial cost as well as the operating cost of such prior equipment has been quite burdensome.

The foregoing high costs and disadvantages of spraying orchards and the like with dilute spray have long been recognized, and efforts have been made for many years to use what have been called spray "concentrates" in which the ratio of chemical to water has been increased. While mention is found in the literature of using spray concentrates that have up to eight times the proportion of powdered chemical as compared with dilute sprays, it has been found that where the concentrate goes as high as four times the usual dilute spray ratio, the spraying results are unsatisfactory. Thus, with prior equipment, the increase in ratio of chemical to water up to four times the accepted dilute spray ratio has been accomplished only by a sacrifice in the effectiveness of the spraying operation. In other words, with such a spray concentrate, the small spray orifices of the nozzles normally used for breaking up the dilute spray were quickly plugged up and rendered inoperative, and as a result, larger nozzles were adopted and the number of nozzles was reduced materially so as to maintain the required pressure in the system and limit the total delivery rate. Such larger nozzles, however, did not break up the spray material to a sufficient extent, and therefore, the coverage of the tree surfaces was found to be inadequate.

These prior attempts to use spray concentrates have resulted in a further difficulty in that the substitution of the larger nozzles to adapt a sprayer for use of spray concentrates makes it impossible to use the refitted sprayer for dilute sprays, oil based sprays and the like, so that with prior equipment it has been necessary to spend many hours' time whenever it is desired to change from one type of spray material to another.

As a result of the poor coverage that has been attained in the use of so called "spray concentrates" as above described, and the difficulties of changing from one type of spray to another, it has been noted that there has been a marked tendency for growers to discard the use of spray concentrates and to go back to the use of dilute spray mixtures.

In view of the foregoing it is the primary object of the present invention to enable increased efficiency to be attained in spraying orchards, row crops and the like and to reduce the operating costs and spraying time involved, and an object related to the foregoing is to enable the size, weight and cost of spraying equipment required for such spraying operations.

Another important object of the invention is to enable flowable spray mixtures of widely varying types and consistencies to be properly and efficiently applied by the same spray apparatus without material adjustment or refitting hereof, atnd a related object is to provide spray apparatus that will handle with equal effectiveness, sprays that may vary from a truly liquid form to a form that approached a thick, sludge-like slurry.

A further and important object of the present invention is to eliminate the necessity for frequent reloading of spraying apparatus of the aforesaid type, and a related object is to reduce the water requirements of spraying operations with the related reduction in the labor and equipment costs involved.

Another object of this invention is to enable spray mixtures to be employed that are so highly concentrated as to be in the nature of a sludge-like slurry, and to enable such highly concentrated mixtures to be efficiently and uniformly applied to the surfaces of the trees or crops that are being sprayed. A further and related object is to enable trees and row crops to be sprayed with a quick-drying spraying mixture so as to eliminate the losses involved in "washdown" of the spray mixture and eliminate the necessity for subsequent treatment of the soil to restore the required soil balance.

In spray apparatus of the kind heretofore used, the total delivery rate from the spray apparatus has been governed jointly by the flowability of the spray mixture, the size and number of spray discharge orifices, and the pressure at which the spray material has been supplied to such orifices, and any calibration of such prior apparatus may be disturbed by variations in any one of these factors. In particular, it is found that the calibration of a spraying unit to meet a desired application rate has required the checking of the orifice sizes which vary due to wear, and when there is a change in the desired application rate, or a change in the amount of total discharge as related to time, the calibration of the apparatus has been exceedingly difficult. It is therefore another important object of this invention to provide spray apparatus which is in a practical sense independent of the variations of the size of the discharge orifices for all of the spray mixtures that are to be used from a truly liquid mixture to a sludge-like slurry such as that above mentioned, and related objects of this invention are to provide such spray apparatus that may be quickly and easily calibrated or checked for calibration when a different discharge rate is to be established.

Another and more specific object of the present invention is to provide a spraying apparatus wherein the apparatus may be operated continuously for long periods without reloading, and to so construct and arrange the spraying apparatus that it is small in size so that it is adapted for tractor mouning on the usual load-supporting linkages of the tractor.

A further object is to provide such spraying apparatus wherein the power requirements are relatively small so that the apparatus may be driven from the power take-off shaft of a tractor upon which it is mounted. More specifically, it is an object to provide a spray apparatus of the aforesaid character wherein the spray material is accurately metered at a rate that is proportional to the rate of forward travel of the vehicle on which the spray apparatus is mounted, thus to assure that the spray material will be applied evenly despite variations in rate of travel of the spraying vehicle.

It has been pointed out hereinbefore that in order to assure proper application of the spray material to all sides and surfaces of the leaves, branches and fruit of an orchard, it is customary to vary the direction of the air blast as the spraying apparatus moves through an orchard. In the past this has been accomplished by rocking or bendable vanes that serve as air directing means and which are operated at a relatively rapid rate as the movement of the spraying apparatus progresses. Such vanes as used in the prior spraying units have been relatively complicated in their form and mounting and relatively difficult to operate at the speeds required, and it is therefore another important object of this invention to simplify the structure and operation of air directing vanes in spraying apparatus.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 3 is a side elevational view of the spraying apparatus, the view being taken from the opposite side of the apparatus;

FIG. 3A is a fragmentary view illustrating a different form of air deflecting means;

FIG. 3B is a view taken substantially along the line 3B—3B of FIG. 3A;

FIG. 4 is a rear elevational view of the spraying apparatus, certain shroud plates being removed to show structure that is normally concealed;

FIG. 5 is a longitudinal sectional view through one of the spray nozzles;

FIG. 6 is a transverse sectional view taken substantially along the line 6—6 of FIG. 5;

FIG. 7 is a plan view of the structure shown in FIG. 7;

FIG. 8 is an enlarged vertical sectional view of the metering pump unit;

FIG. 9 is an elevational view of the metering pump unit with certain of the parts removed so as to show the internal actuating and control mechanism;

Figure 1:
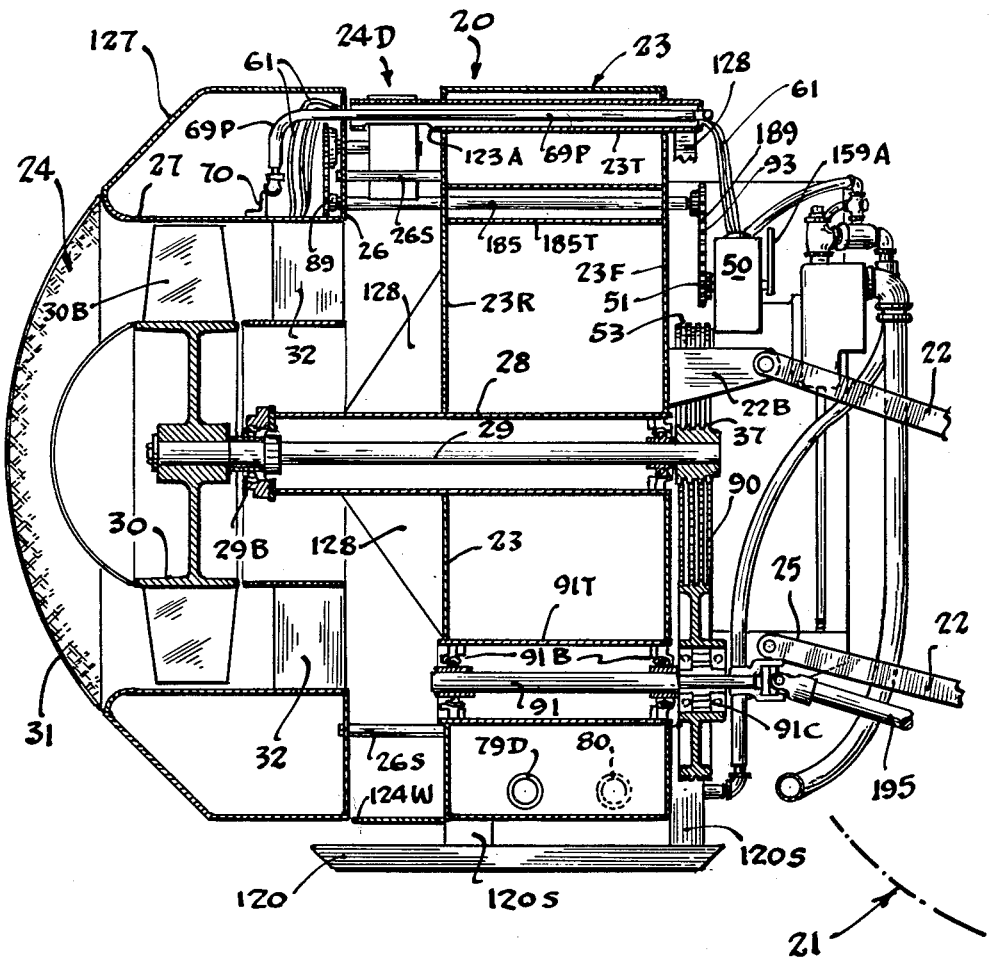
FIG. 1 is a vertical central section taken from front to rear through a spraying apparatus embodying the features of the invention, the spraying apparatus being shown schematically in association with a tractor upon which the spraying apparatus is mounted.

For purposes of disclosure the invention is herein illustrated in FIGS. 1 to 11 as embodied in a spraying unit 20 which applies spray material in the form of a thick, sludge-like slurry so as to have high output capacity, while at the same time being relatively small so that it may be rear-mounted on a tractor 21 so as to be supported by means of the usual hydraulically actuated pickup links 22 of the tractor. The spray unit 20 is thus supported on the tractor so that it may be readily maneuvered through orchards, fields and the like, and the total power requirements for all of the elements of the spraying apparatus are supplied by a drive that is connected to the power take-off shaft of the tractor 21.

The spraying unit 20 comprises a tank 23 that is of a relatively short cylindrical form, and rearwardly of the tank 23 a fan unit 24 is carried on the tank 23 so that air drawn into the rear end of the fan unit 24 may be discharged as a high velocity carrier air blast generally radially from the open edge portions of the fan outlet 24D.

Forwardly of the tank 23, frame structure is provided on the tank whereby mounting of the various operating elements of the spraying apparatus may be accomplished. Thus, the forward wall 23F of the tank 23 forms a part of the mounting or frame structure of the spraying apparatus 20, and a pair of vertically extended frame plates 25 are extended forwardly from the wall 23F of the tank near the outer edges of the tank. The frame plates 25 provide mounting connections 22C for the lower pickup links 22, while a rearwardly extending bracket 22B is provided so as to extend forwardly from the wall 23F for pivotal association with the upper mounting link 22. The frame plates 25 thus cooperate with the wall 23F in providing a mounting frame for supporting the apparatus on a tractor, and also for other supporting and mounting functions, as will be described hereinafter. A supporting base for the spray unit 20 is afforded by horizontal runners or skids 120 located beneath the frame plates 25 and connected thereto and to the tank 23 by upwardly extending struts 120S.

The fan unit 24 has what may be termed the forward vertical wall of its housing provided by the rear wall 23R of the tank 23, and on the wall 23R, and substantially parallel but supported so as to be spaced rearwardly therefrom by spacer assemblies 26S, there is provided a second vertical plate or wall 26 from which a cylindrical extension 27 projects in a rearward direction. The space between the wall 26 and the wall 23R constitutes the radial outlet 24D for the fan unit 24. Within the cylindrical extension 27, and extending forwardly into and through the tank 23, a clearance tube 28 is provided within which a drive shaft 29 is mounted, and at its rear end the drive shaft 29 extends through a bearing 29B, and a blade-type fan 30 is fixed to the rear end of the shaft 29 within the cylinder tube 27. The rear end of the tube 28 is rigidly supported by angular brace plates 128 that are radially disposed relative to the tube 28 and are connected to the plate 23R. The rear end of the housing extension 27 has a projecting screen 31 mounted thereon, and when the fan 30 is rotated, its blades 30B draw air into the tubular housing extension 27 and past a series of stationary radial air-directing blades 32 toward the radial discharge space between the plates 23R and 26. This air is discharged radially from that portion of the fan outlet 24D which has been uncovered. It might be pointed out that along its bottom edge the fan casing is closed by a wall 124W that extends between the walls 23R and 26 and about the right side of the radial discharge area as shown in FIG. 4, so that the air discharge may be confined to a particular arcuate section of the discharge outlet 24D.

At its forward end the shaft 29 is extended beyond the wall 23F and has a multiple sprocket 37 fixed thereon so that driving power may be applied to the sprocket 37 for operating the fan 30. The particular way in which drive is applied to the sprocket 37 will be described hereinafter.

The fan 30 is arranged to discharge air from the fan housing at a relatively high velocity in the neighborhood of from 70 to 90 miles per hour, but under the present invention, where water-chemical ratio of the spray mixture is extremely low, the capacity of the fan 30 may be relatively low, as will be explained, so that a fan capacity of about twenty five thousand cubic feet per minute may be employed to accomplish spraying operations that have heretofore required a fan capacity of from eighty thousand to ninety thousand cubic feet per minute.

Under the present invention the spray mixture that is contained in the tank 23 is air-atomized at a plurality of points along the air discharge outlet 24D of the fan by means of a plurality of nozzles 38 which are mounted on the plate 26 and extend forwardly as shown in FIG. 3 so that the discharge openings of the nozzles are located midway between the plates 23R and 26 and adjacent their outer edges. The nozzles 38 are shown in detail in FIGS. 5, 6 and 7 of the drawings, and it may be observed that these nozzles 38 provide for quickly and easily changing the size of the discharge openings thereof, and for quick and easy cleaning when this is required.

Thus, each nozzle 38 comprises an elongated rod-like member 39 that has a longitudinal bore 40 extended into one end thereof, and at said end, the member has a reduced screw-threaded nipple 39W formed thereon so that the member 39 may be threaded into one of the cross arms of a T fitting 41. The opposite cross arm of the T fitting has a plug member 42 screwed therein, and this plug member has a relatively small tube 43 extended therethrough, and into the passage 40 in an axial relation, as will be described. The tube 43 is spaced from the wall of the bore 40 to provide an annular passage about and concentric with the tube 43. The plug 42 has a threaded cap 42C and packing 42P at its other end in surrounding relation to the tube 43 to provide a tight connection therebetween.

The other arm 41A of the T fitting constitutes an inlet for compressed air, while the tube 43 constitutes an inlet passage for spray mixture that is fed to the nozzle 38, as will be described, and at the other or right hand end of the member 39, as shown in FIG. 5, means are provided for air-atomizing the spray mixture and discharging the same laterally from the nozzle in finely divided form and into and in the same general direction as the blast of carrier air. Thus, as shown in detail in FIGS. 5 and 7, the right hand end of the member 39 has a relatively wide transverse slot 44 cut therein and to a depth beyond the central axis of the nozzle, and air and spray mixture are supplied to this slot as will be described so that the slot 44 constitutes a mixing and atomizing chamber from which the atomized spray mixture is discharged radially through a discharging opening in the form of a narrow slot 45. This slot 45 is formed by milling or sawing in a replaceable sleeve 46 that may be slid endwise over the right hand end of the member 39 into a tightly sealed relationship with respect to a pair of O rings 47 that are mounted in appropriate annular slots in the member 39 on opposite sides of the mixing chamber 44.

The air and the spray mixture enter the chamber 39 in such a relation that the flow of pressure air passing the end of the tube 43 has an aspirating action of the spray mixture which is being constantly advanced in the tube 43 under a slight feeding pressure as will be described. Thus, the right hand end of the bore 40 is slightly reduced as at 40R where the bore opens into the mixing chamber 44, and a discharge tip 43T in the form of a short length of smaller tubing is fixed in the end of the tube 43 and projects therefrom so that its right hand end is located about midway between the ends of the reduced bore or throat 40R of the air passage.

With this nozzle arrangement, the spray mixture is withdrawn from the tip 43T with an aspirating action, and the compressed air and the spray mixture are violently mixed within the chamber 44 so that the spray mixture is broken up into extremely fine particles and is discharged as a fan-like spray from the discharge slot 44.

Under the present invention the spray mixture from the tank 23 is supplied to the nozzles 38 by positive displacement metering means that operate at a rate that varies with the tractor speed so that the spray mixure will be evenly applied even though there may be substantial variations in the speed of advancing movement of the tractor. The metering action is timed with respect to the tractor speed by operating a metering pump unit 50 through a drive connection from power take off shaft of the tractor as will be described. Under the present invention the metered flow of spray material that is supplied by the pump unit 50 to the nozzles 38 may be cut off or stopped at the will of the operator so as to discontinue the spraying operation, as for example, when the spraying apparatus is passing between adjacent trees in an orchard, and the means for attaining such control will be described in detail hereinafter.

The pumping unit 50, as shown herein, comprises a main casting 150, FIG. 8, that has a central web 150W from which flanges 150F and 250F extend respectively, in reaward and forward directions as shown, particularly, in FIG. 8 of the drawings. The rearwardly extending flange 150G has a cover plate 150C secured thereto so as to define a gear chamber within which a gear 150G is mounted in fixed relation on a rotatable central drive shaft 150S. The shaft 150S has a relatively small sprocket 51 fixed on its outer or rear end as shown in FIGS. 1 and 8, and the shaft 150S is driven by a pinion 52 that is formed on the forward end of a stub shaft 152 that is journalled in and projects through the rear cover plate 150C. At its rear end the stub shaft 152 has a multiple sprocket 53 fixed thereon through which the pump unit 50 is operated or driven as will be described hereinafter.

The forwardly projecting flange 250F of the casting 150 provides an internal chamber within which the pump driving and control mechanism is housed, and this chamber is closed by a forward cover plate 250C. Within the drive chamber that is thus provided the forward end of the drive shaft 150S has an eccentric pin or extension 54 upon which a ball bearing unit 54B is mounted so that the outer race of the ball bearing unit may serve as an operating means for driving a plurality of similar positive displacement pumps 50–1 to 50–4, one such individual pump being provided in this instance for each of the spray nozzles 38.

The pumps 50–1 to 50–4 are secured at intervals of 90° about the flange 250F of the pump casting 150, and each of these pumps has a similar positive displacement pumping means adapted to be operated by the eccentric 54 in the rotation of the drive shaft 150S. In the present instance the pump units 50–1 to 50–4 are in the form of diaphragm pumps, each of which has a flexible diaphragm 56, the border of which is clamped between the opposed flat face of the individual pump body 150–1 for example, and the flange 250F. These opposed faces are recessed so that a pump chamber 57 is provided in the pump body and a clearance chamber 57C is provided in the flange 250F. The diaphragm 56 has a push rod 156 associated therewith so as to project radially inwardly toward the axis of the drive shaft 150S. An enlarged head 256 on each push rod is guided by portions of the casting 150 for radial movement, and a spring 356 urges the push rod in an inward radial direction, the spring 356 being disposed about the rod between the head 256 and the inner surface of the flange 250F. Hence, then each metering pump is urged through its suction stroke by its spring 356, and is positively moved in an outward or discharge stroke by engagement of the outer race of the ball bearing unit 54B with the inner end of the head 256 or the push rod of the pump.

The spray mixture to be pumped is supplied to a common intake passage 58 in the pump body 150, and each of the individual pumps has a supply passage 158 extended from the passage 58 to the pumping chamber 57, and within this passage 158 an inlet check valve 258 is positioned. An outlet passage 358 extends from the pumping chamber 57 through the pump body and has an outlet valve 458 therein, and each of the individual pumps has its outlet passage 358 separately connected to its related spray nozzle 38, as will be described.

It has been pointed out that rotation of the drive shaft 150S may reciprocate or operate the push rods 156 of the four individual metering pumps, and means are provided whereby the pumping strokes of these pumps may be adjusted so that the desired spray coverage will be attained. The means for adjusting the stroke of the pump push rods 156 is in this instance also employed for stopping the pumping operation of the several pumps, as for example, when the discharge of spray material is to be discontinued between trees. Such control means includes a four-lobe cam 59 fixed on the inner rear end of a shaft 159 that extends through the cover plate 250C on the same axis as the drive shaft 150S. The cam 59 has four identical and gradually sloping cam lobes 59C, as indicated in FIG. 9, and these cam lobes are adapted to engage respectively with control pins 256C that extend from the respective heads 256 of the push rods. As will be evident in FIG. 9 of the drawings, the rotation of the cam 59 in a counterclockwise direction will cause the high points of the several cam lobes 59C to engage the related pins 256C so as to urge the heads 256 radially outwardly and beyond the range of the rotating eccentric drive member. Thus, when the pumping action is to be stopped, the cam 59 is rotated just slightly less than 90° in a counterclockwise direction from the position shown in FIG. 9. It should be pointed out that the slope of the several cam lobes 59C is quite gradual, and by setting the cam 59 at some intermediate position, the extent of inward radial movement of the push rods 156 may be controlled so that a shorter pump stroke is attained in each rotation of the drive shaft 150S. This affords an output adjustment for the pump 50, and this output adjustment is attained by limiting the extent of clockwise movement of the control shaft 159.

The control shaft 159 is arranged so that it is normally urged in a counterclockwise direction, FIG. 5, to what may be termed a pump-off position, and this is accomplished by an operating arm 159A that is fixed on the shaft 159 and has a spring 159S acting thereon to urge the shaft 159 in a counterclockwise direction to its pump-off position.

Under the present invention the control shaft 159 is adapted to be shifted in a clockwise direction toward a pump-on position by means that are under control of an operator seated on the tractor. This means includes a piston and cylinder unit 359 having the piston rod 359P thereof connected by a pin and slot connection with the end of the arm 159A. Pressure air is supplied through a hose 459 to the left hand end of the piston and cylinder unit 359 as viewed in FIG. 10, and in this line a manual control valve 459V is located, this valve normally being mounted on the tractor adjacent the driver's seat.

When the operator wants the pump to start its pumping operation, air is supplied to the piston and cylinder unit 359, and normally the cylinder would rock the cam 59 clockwise to substantially the position shown in FIG. 9. However, if a shorter pump stroke is desired, this may be attained by limiting the stroke of the piston rod 359, and for this purpose, a control rod 559 mounted on and parallel to the piston rod extends slidably through a stationary bracket 559B, and nuts 559N on the rod serve as an adjustable means for limiting the piston stroke, thereby to enable the stroke of the pumps to be adjusted.

The adjustment that is thus afforded is a common or simultaneous adjustment of the stroke of all of the four individual pumps, but in some instances, it is found that it may be desirable to feed the supply mixture at different rates to one or more of the nozzles 38. For accomplishing such individual adjustment, individual adjusting means are provided for varying the pumping stroke of the several individual pumps. Thus, as shown in FIG. 8, cup-like members 60 are mounted on rotative studs 60S that extend through the cover plate 250C so that one of the cup-like members extends loosely over the end of each of the pins 256C. The cup-like members 60 are mounted eccentrically on the stud 60S so that by rotative setting or adjustment of the stud 60S, the inward or suction stroke of the releated push rod 156 may be variably limited. Thus, certain of the pumps may operate with pumping strokes determined by the cam 59, and one or more of the pumps may be adjusted to a shorter stroke by the studs 60S. Lock nuts 60N are provided on the studs 60S for securing the same in any desired adjusted position.

Figure 2:
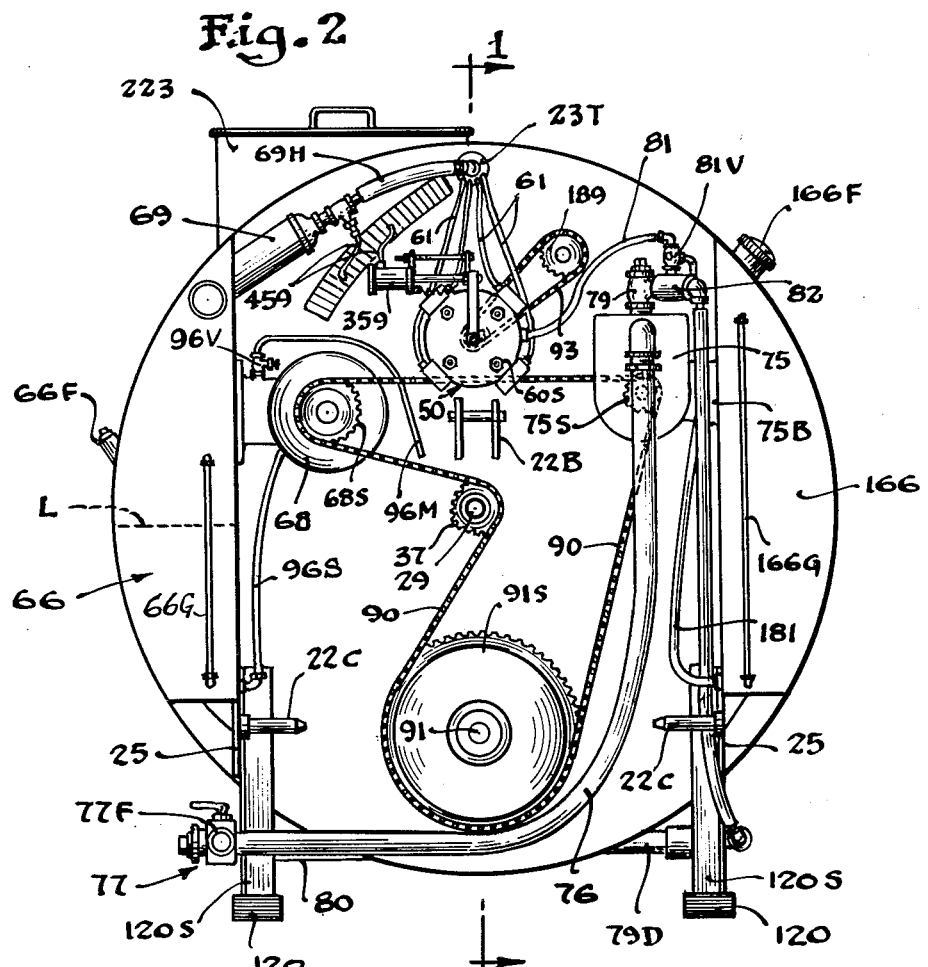
FIG. 2 is a front elevational view of the spraying apparatus, the view being taken from the right in FIG. 1.

The output or discharge passages 358 of the several pumps 50-1 to 50-4 have individual delivery hoses 61 connected thereto, and these hoses are extended upwardly from the pump as shown in FIGS. 1 and 2, and through the wall of a clearance tube 23T that is extended through the upper portion of the tank 23 and substantially across the outlet opening 24D. The hoses 61 extend from the tube 23T through the wall 26, and along the rear side of the plate 26 to the spray liquid connections 43 of the respective nozzles 38. The tube 23T serves additional functions as will be pointed out hereinafter.

Compressed air for air-atomizing the spray mixture in the nozzles 38 is provided from a supply tank 66 that is formed in part by the left-hand frame plate 25, as viewed in FIG. 2. Thus, the tank 66 has its right hand wall, as viewed in FIG. 2, formed by the adjacent frame plate 25, while a suitable arcuate plate and a forward plate cooperate with the wall 23F of the tank 23 to complete the tank 66 which has an inlet opening 66F therein so that the tank may be partially filled with spraying oil L that is used as a lubricating oil for purposes that will appear hereinafter. A sight glass 66G is preferably provided for the tank 66, as shown in FIG. 2.

A similar tank 166 is provided at the right hand side of the apparatus, as shown in FIG. 2, this tank being provided for containing a supply of fresh water to be used in flushing the pump 50 and the nozzles 38, as will be described. The tank 166 has a filling opening 166F and a sight gauge 166G.

Compressed air is supplied to the tank 66 to maintain a predetermined pressure level therein by means of an air compressor 68 that is mounted on the left hand frame plate 25, as viewed in FIG. 2. The compressor 68 is preferably cooled by air derived from the fan 24, and for this purpose the sleeve 23T has an air inlet 123A cut therein so as to face radially inwardly of the fan outlet 24D. The air entering the inlet 123A passes forwardly through the tube 23T and then passes laterally from the tube 23T through a flexible hose 128, the other end of which is fixed in position to discharge air over the compressor 68. The outlet of the air compressor 68 discharges to the tank 66. An outlet stub 69 from the upper portion of the tank 66 supplies compressed air through a hose 69H to the forward end of a pipe 69P that extends rearwardly through the clearance tube 23T and is connected at its rear end to a manifold pipe 70 that extends arcuately around the outside of the fan housing 27 as shown in FIGS. 1 and 4. Hose connections 71 are provided from the manifold 70 to the arms 41A of the respective nozzles 38. It might be pointed out that during operation of the present apparatus, compressed air flows constantly from the tank 66 through the manifold 70 and to the several nozzles 38, and discharge of spray material from the nozzles 38 is controlled quickly and easily by cutting off the supply of spray mixture under control of the valve 459V as hereinbefore described.

The supply of spray mixture from the tank 23 to the metering pump 50 is, under the present invention, related with a spray mixing and circulating system which includes a centrifugal pump 75 that is mounted on the right hand frame plate 25 by means of an adjustable pump bracket 75B, and this pump is driven constantly as will be hereinafter described. The centrifugal pump 75 has an inlet connection including a hose 76 that is connected to a three-way valve 77. One port 77F of the valve 77 constitutes an inlet port which in one setting of the valve 77 may serve through a suitable hose connection for loading the tank 23 with water, and when thus connected the water is drawn through the valve 77 and the intake hose 76 to the pump 75 from which it is discharged through an output line 79 into the tank 23. It is important to note that the output line 79 includes a hose 79H which is connected to a horizontal discharge portion 79D that opens into the right hand side of the tank 23, as viewed in FIG. 2. The pipe 79D is relatively close to the bottom of the tank, and the discharge of water or spray mixture from the pipe 79D serves to produce a mixing or agitating action which maintains the spray mixture in a uniform condition, as will be discussed hereinafter.

After filling of the tank 23 with water has been completed, the three-way valve 77 is adjusted so that the inlet connection or port 77F is closed, and a connection is established between the hose 76 and horizontal intake pipe 80. The pipe 80 extends horizontally into the lower portion of the tank 23, as indicated in FIG. 1, and terminates in spaced relation to the pipe 79D. The spray chemical in the form of a powder may be introduced into the tank 23 through a large covered filling opening 223, and this may be done either before or after the water is introduced. The pumping action serves, of course, to agitate the chemical and mix the same with the water, and since the pump 75 is operating constantly during spraying operation of the apparatus, there is a continual and relatively high volume circulation of the liquid spray mixture through the pumping system, and the mixture is constantly agitated and maintained in a uniform condition by the discharge of liquid from the pipe 79D into the lower portion of the tank.

The spray mixture is supplied to the metering pump 50 by an intake connection 81 that is extended from the passage 58 of the pump 50 through three-way valve 81V to a fitting 82 that is interposed in the discharge line 79 of the pump 75. The metering pump 50 is of relatively small capacity as compared with the capacity of the pump 75, so that a very small proportion of the mixture flowing through the pipe is withdrawn by the pump 50, and it may be noted that this spray mixture that is withdrawn has just passed through this centrifugal pump 75 so that it has been subjected to a final mixing operation just before it is delivered to the metering pump.

Figure 2A:
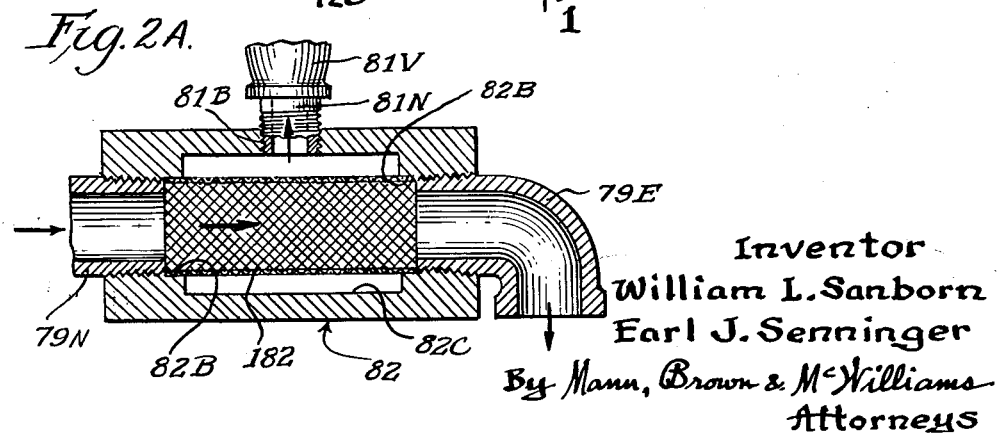
FIG. 2A is a sectional view of the strainer that is included in the intake line of the metering pump.
Figure 10:
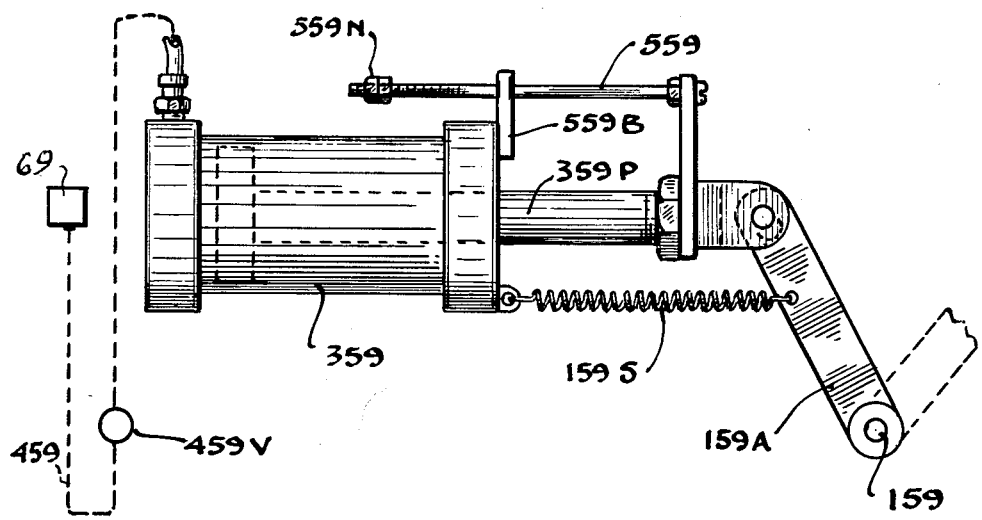
FIG. 10 is a view of the air cylinder control means that is utilized for starting and stopping the pumping unit.

Under the present invention the fitting 82 is embodied as a self-cleaning strainer and the details thereof are illustrated in FIG. 2A of the drawings. Thus, it will be noted that the fitting 82 is in the form of an elongated cylindrical member that has threaded bores 82B extended into its opposite ends axially thereof, and between these bores the fitting 82 is internally enlarged to provide a clearance chamber 82C that is of a substantially greater diameter than the threaded openings 82B. The valve 81V that is included in the supply line to the metering pump 50 is mounted on the fitting 82 midway between its ends by means of a nipple 81N that is threaded into a radial bore 81B so that the supply line 81 for the metering pump 50 connects with the chamber 82C.

Within the fitting 82 a cylinder wire mesh sleeve 182 is positioned so that its opposite ends are located snugly within and are supported and centered on the adjacent portions of the two bores 82B, and at one end of the fitting the valve 89 has a laterally extending nipple 79N threaded into the bore 82B so as to engage the adjacent end of the wire screen or sleeve 182. At the other end of the fitting 82, an elbow 79E that forms a part of the return line 79D is similarly threaded into the other bore 82B so as to engage the other end of the wire sleeve 182. The fitting 82 thus provides a strainer through which the spray mixture must pass in an outwardly radial direction in order to reach the spray line 81 of the metering pump, and hence the spray mixture that is to be metered is properly strained.

The strainer that is thus provided is self-cleaning in character, for as above pointed out, the metering pump 50 withdraws but a small proportion of the mixture that is flowing through the centrifugal pump 75. Hence, there is a constant and relatively large flow of spray mixture longitudinally through the fitting 82 and within the screened sleeve 182, and as a result of this constant and relatively high volume and high speed flow, any lumps of spray chemical, or other material, that may have been stopped by the screen 182 are flushed in a right hand direction through the fitting 82 and back into the tank 23 so as to be subjected to a further mixing operation. This assures proper operation of the metering pump 50.

The three-way valve 81V is normally set to connect the fitting 82 with the pump supply passage or hose 81, but in its other setting, the pump inlet hose 81 is connected to a water supply hose 181 that extends from the other port of the valve 81V to the lower portion of the water tank 166. Thus, the water in the tank 166 may be utilized for flushing and cleaning the pump and the nozzles 38, and in addition, the calibrating operations that may be necessary with respect to the pump 50 may be accomplished by pumping water from the tank 166.

As shown herein, the outlet 24D of the fan 24 has been restricted through the application of a cover plate 124D along one side of the fan outlet so that the fan outlet 24D is open only along one side thereof, and with this arrangement the spraying apparatus 20 is adapted for spraying trees along only one side of the path of travel of the spraying apparatus. Means are provided in the open portions of the fan outlet for varying the direction and intensity of the air blast periodically at relatively short intervals so that the desired swaying and turning movement of the leaves and fruits of the trees may be induced by the varying action of the air blast thereon. This swaying and turning is recognized as being desirable to assure spray-coating of all sides of the fruits, leaves and limbs of a tree in the course of a spraying operation.

Under the present invention, the periodic deflection of the air blast is accomplished by air-directing vanes or plates that are simple in both structure and operation, and two different forms of air deflecting means utilizing the same basic mounting and mode of actuation are provided for obtaining a somewhat different pattern of air deflection in the respective types. Thus, in FIGS. 1 to 4, a plurality of rotatable transverse shafts 85 are mounted relatively close to the outer edge of the plate 26 in an equally spaced relationship so as to extend through the plate 26 and partially across the outlet 24D. These shafts 85 are rotated in unison during operation of the spraying unit, and each shaft has a deflector plate 86 fixed thereon so as to project equally on opposite sides of the shaft and in a plane that is relatively close to and parallel to the axis of the shaft. The plates 86 are narrower than the outlet 24D so as to be spaced from the plates 26 and 23R. Thus, as the shafts 85 are rotated, the angle of the deflector 86 will be gradually changed so that the path of the air blast will be varied, and at times when adjacent deflector plates 86 are disposed substantially parallel to the plane of the outlet 24D, the intensity of the blast in that area will be materially reduced.

The deflector plates 86, as shown in FIGS. 1 to 4, are effective only to change the direction of the air blast in a vertical plane that is normal to the line of travel of the spray unit, but in some instances it is desirable also to vary the direction of the air blast in what may be termed a front to rear direction with respect to the path of travel of the spraying unit. Such control of the air blast may be attained by the alternative deflector plate structure illustrated in FIGS. 3A and 3B of the drawings.

Thus, in FIGS. 3A and 3B, each deflector unit has a rotatable shaft 85 which corresponds in form and location with the shafts 85 shown in FIGS. 3 and 4, but in this instance, a circular deflector plate 186 is mounted on the shaft 185 midway between the plates 26 and 23R in such a relation that the shaft 85 extends through the center of the plate 186 with the plate supported at an acute angle to the axis of the shaft 85. The deflector plate 186 thus has the characteristics of a wobble plate, which in rotation of the shaft 85, will progressively change the direction of the air blast so as to direct the air blast at certain times in an upward direction, at other times in a downward direction and at still other times to directions that extend at either a forward angle or a rearward angle with respect to the path of travel of the spraying apparatus.

The deflector plates 86 and 186 may be employed selectively according to the kind of air blast variations that are desired, and in the use of either deflector plate arrangement, the operation thereof, and the periodic changes of direction of air blast, are accomplished by continuous rotation of the mounting shafts 85 in one direction.

All of the shafts 85 of the deflector system are driven in unison, and as herein shown, each shaft has a sprocket 87 thereon just rearwardly of the plate 26. These sprockets 87 are connected by an endless chain 88 which has an idler pulley 89 associated therewith. Near the shaft 85 that is located in the uppermost position on the unit, as shown in FIG. 4, a drive sprocket 89 is meshed with the chain 88, and the sprocket 89 is fixed on the rear end of a drive shaft 185, as shown in FIG. 1. The shaft 185 extends forwardly through the upper portion of the tank 23 within a clearance tube 185T, and drive sprocket 189 is fixed thereon just forwardly of the forward wall of the tank 23 so that drive may be transmitted to the shaft 185, as will be described. A removable shroud 127, FIG. 1, is extended from the outer edge of the plate 26 to the rear edge of the fan housing 27 so as to house and protect the deflector drive, the material supply hoses and the air supply lines.

It has been pointed out hereinabove that all of the power consuming elements of the present spraying apparatus are driven from a common power source, and to enable this to be done, the power input shafts of the compressor 68, the metering pump 50 and the centrifugal pump 75 are arranged parallel to the axis of the fan 29 and have multiple drive sprockets 53 of the metering pump, 37 of the fan, 68S of the compressor, and 75S of the pump 75 located in a common vertical plane. An endless chain drive is provided in the present instance by a plurality of parallel endless roller chains 90 that are extended about the sprocket 37 on the right hand side thereof as shown in FIG. 2, and then upwardly at an angle and about the left hand side of the sprocket 68S of the compressor. The chain 90 then extends to the right under and in engagement with sprocket 53 of the metering pump, and then over and downwardly about the sprocket 75S of the pump 75 to relatively large sprocket 91S that is mounted on the forward end of a jack-shaft 91 substantially below the sprocket 37. The mounting of the sprocket 91S on the shaft 91 includes an overrunning clutch 91C so as to prevent undue stress on the drive chain when the tractor motor is stopped. The chains 90 then extend upwardly to the sprocket 37. The jack-shaft 91 is mounted by means of bearings 91B that are disposed within a clearance tube 91T that extends through the tank 23 as shown in FIG. 1. An endless chain 93 is extended around the sprocket 51 and the sprocket 131 for driving the air deflector system.

Figure 11:
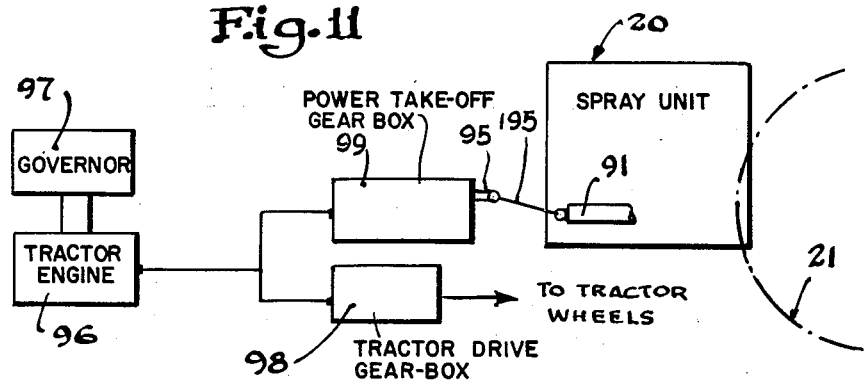
FIG. 11 is a schematic view showing the way in which the spray material is delivered at a rate that is constant with respect to the forward rate of travel of the tractor.

The common drive that is thus provided, may within the purview of the present invention, be driven from any suitable power source, but where the spraying apparatus is adapted for tractor mounting on the lifting links 22 of a tractor, the common drive system is actuated from the power take-off shaft 95 of the tractor that is shown diagrammatically in FIG. 11. The power take-off shaft 95 is connected to the jack-shaft 91 by means of a telescoping, universal jointed drive shaft 195, FIGS. 1 and 11.

It has been pointed out that the tank 66 contains a supply of liquid lubricant L which is maintained under relatively high pressure by the compressed air in the top portion of the tank 66, and this lubricant is utilized to supply continuous lubrication to the elements of the drive. The oil that is used in the present instance is a tree spraying oil of the kind usually used for scale control. It has been found that such oil has good lubricating qualities. A small trace of such oil is carried by the compressed air to the nozzles 38, and by use of spraying oil, it is possible to attain the desired lubrication in a simple way while at the same time assuring that there will be no damage to the trees such as would result from the use of ordinary oil.

As shown in FIG. 2, a supply pipe 96S is extended from a lower portion of the tank 66 to the compressor, and an oil mist line 96M is extended from the compressor through a mist control valve 96V so as to discharge onto the drive chains 90.

The spraying unit 20 as herein shown is relatively small, as will be evident from the comparison of the unit 20 with the size of the wheels of the tractor 21, and the tank 23 has a relatively small volumetric capacity. In the present instance the tank capacity is substantially ninety gallons, and the fan unit 24P that has been employed has an output of substantially 25,000 cubic feet per minute at a velocity of about eighty miles per hour.

As hereinabove pointed out the spraying apparatus of the present invention enables the spraying mixture to be so highly concentrated so as to be in the nature of a sludge-like slurry so that for attaining the same degree of application of chemical to the trees or crops, the total volumetric output of the nozzles 38 is relatively small as compared to prior spraying apparatus of this general kind.

In the use of prior spraying apparatus it has been pointed out that with the normal dilute spray mixture, the chemical is mixed in the ratio of two pounds of chemical to one hundred gallons of water, so that in the five hundred gallon tank of the prior spraying apparatus, there was contained but a total of ten pounds of chemical. Even if prior apparatus were used with the concentrated mixtures that have heretofore been proposed, the ratio of chemical to water in the spray was relatively small. As an example, in a concentrate that was four times the normal dilute ratio, the total chemical content in the five hundred gallon tank would be about forty pounds. In contrast to the prior spraying apparatus, it may be pointed out that with the apparatus of the present invention, as described herein, it is possible to use as much as 300 pounds of powdered spray chemical in the ninety gallon tank. This quantity or weight of powdered spray chemical actually occupies a considerable portion of the volume of the tank 23, and the balance of the tank is filled with water which may amount to about fifty-five gallons.

It has been pointed out that usually the spraying apparatus is advanced through an orchard at about a rate of 1½ miles per hour, and at this rate it is customary to apply the spray in such volume that the chemical will be discharged at a rate of about one pound per minute. Operating at such a rate of spray application, with three hundred pounds of spray chemical in the tank 23, the spraying apparatus of this invention may operate continuously for a period of three hundred minutes. Applying chemical at the same rate with the dilute spray above described, it would be possible to operate for only ten minutes from a five hundred gallon tank. Hence the time lost in filling operations has been materially reduced by the apparatus of the present invention, and of course the waste of water and labor and equipment in hauling the excess water has been eliminated. Moreover, the weight of spray mixture that must be carried to the trees by the air blast has been greatly reduced so as to enable the output capacity of the fan to be minimized.

The use of the extremely thick or sludge-like spray mixture by the apparatus of the present invention produces a uniform coating on the leaves, fruit and the like, and this coating, as it is deposited, contains so little water that it takes but one minute or so for the spray to dry. This quick drying action of course eliminates the dripping or run-down that has been experienced with prior spraying apparatus, and enables work in an orchard to be resumed almost immediately after completion of the spraying operation.

The present apparatus discharges the spray material at a rate that varies with the rate of forward movement of the vehicle, and this of course assures uniform application of spray material. The metering action in the present instance is attained through the drive of the metering pump from the power take-off shaft 95 of the tractor, FIG. 11, and in this connection it may be pointed out that during a spraying operation the speed of the tractor engine 96 is usually controlled by governor 97, FIG. 11, and the speed of the power take-off shaft 95 with relation to the speed of forward travel of the tractor is determined by the particular gear in which drive gear box 98 of the tractor is set. Actually the power take-off shaft 95 usually is driven through a settable gear box 99 from the tractor engine 98, and this, however, has been found to be unobjectionable because a particular user will operate the tractor 21 in the same drive gear and with the same setting of the gear box 99 to the power take-off shaft throughout the entire spraying operation.

The highly concentrated spray mixture is of course put under a feeding pressure by the metering pump, and this pressure is relatively small, being in the neighborhood of twenty pounds per square inch under normal circumstances so as to be about the same as the pressure of the compressed air that is used. The spray mixture is advanced to each nozzle 38, and as it leaves the end tip of the material passage, it is aspirated into the mixing or atomizing chamber by compressed air that flows at a high rate through the surrounding throat 40R. In practice, it has been found that the compressed air should be at a pressure of approximately twenty pounds per square inch, and at this pressure the spray mixture is violently agitated and broken up while it is in the atomizing chamber 40, and is discharged through the slot 45 as an arcuate fan-like spray, the arcuate extent of which is determined by the length of the slot 45, and the base thickness and the particle size of such spray is determined by the width of the slot 45.

It will be observed that the slot 45 of each nozzle 38 is disposed substantially in a vertical plane that is located midway between the front and rear sides of the air blast that is discharged from the discharge opening 24D, and the spray from each nozzle 38 diverges angularly in front and rear directions as it moves away from the discharge slot 45. The finely divided spray is thus well distributed throughout a substantial cross sectional area of the carrier air blast so that it may be picked up and carried by the blast to the surfaces of the trees.

The direction and intensity of the air blast is varied by the constantly rotating deflector plates 86 and this varying control of the air blast causes the air blast to be directed at varying angles upwardly, horizontally and somewhat downwardly as the rotation of the deflector plates 86 progresses. Moreover, it will be observed that the deflector plates 86 are arranged so as to be substantially parallel to each other at all times, and being disposed with their parallel axes arcuately arranged about the discharge opening 24D, certain of the adjacent deflector plates 86 will at certain times in each cycle of operation be effective to substantially block limited areas of the discharge opening. At this time other portions of the discharge openings 24D are either fully or partially open so that there will be progressive variations of the direction as well as variations in the intensity or velocity of the air blast, and this results in the desired twisting and turning of the leaves, fruit and the like by the air blast.

When the direction of the air blast is to be varied to some extent in a front to rear direction with respect to the line of travel of the spraying apparatus, the wobble plate type of deflector plate 186 may be employed, and this produces up and down variations of the direction of the air blast, and in addition varies a direction of the air blast forwardly and rearwardly as the movement of the apparatus progresses.

In the operation of the present apparatus, the spray oil L in the compressed air tank 66 serves as a constant pressure lubricant source through which lubricant is fed continuously to the chains 90. It is also important to note that the pump 75 operates constantly to circulate and mix the spray material, and this circulation takes place at a rate that is far in excess of the pumping rate of the metering pump 50. The metering pump 50 is supplied by withdrawing a part of the flowing or circulating spray mixture from the circulating system so that the spray material that is fed to the nozzle is fully and properly mixed. The circulating pump 75 of course serves for loading the tank 23 with water and for initially mixing the water and the spray chemical.

With the spraying apparatus of the present invention it has been found that the spraying of the orchard or the like may be accomplished in much less time than with prior apparatus, due primarily to the long periods over which the apparatus may be used without reloading, and because of its small size and power requirements the initial cost of the equipment is much less than with prior equipment of the same work-performing capacity. The elimination of "wash down" has of course reduced the drying time so that work can be resumed in an orchard soon after the spraying thereof, and the elimination of "wash down" has resulted in a saving of money that would otherwise be expended in soil restoration. The saving in cost of chemicals due to the elimination of "wash down," plus the saving in labor that results from the reduced need for water, has produced a net saving of about 30% in spraying operations performed with the apparatus of the present invention.

The spray apparatus that has thus been provided under this invention is of such a character that spray material of widely varying consistencies may be properly distributed without material alternation or refitting of the apparatus. The air atomizing spray heads that are utilized under this invention operate with equal facility on conventional liquid sprays such as dilute spray mixture or spraying oils, or on extremely heavy and sludge-like spray mixtures.

In the event that a user does desire to change the size and shape of the discharge openings of the sprays, it is only necessary for such user to remove and replace the sleeves 46 from the nozzles, and this may be done merely by pulling the sleeves endwise off of the body of the nozzle. Similarly, the sleeves 46 may be removed when it is found necessary to clean the discharge openings 45, but in practice, it has been found that the spray discharge openings S may in most instances be cleaned while the sleeve 46 is in place, this being accomplished by merely inserting a thin coin or knife blade through the slot 45.

The present apparatus is also of great advantage in that it lends itself to rapid and accurate calibration where this is desired. Thus the main drive of the apparatus may be connected through a particular gear box setting of the power take-off shaft, the valve 81V may be set so that water will be pumped from the tank 166, and the output hose 61 of one of the metering pumps may be disconnected so that the output of that metering pump may be discharged into a measuring container for a fixed time period to check the volumetric output of the pump. Thus the performance may be checked for any particular driving speed of the apparatus and for a particular stroke adjustment of the individual pump without material loss of time and without loss of spray material. The sight glass 166G has a scale thereon showing the contents of the water tank 166, and such scale may also be used in calibrating the pump unit 50 as to total output.

In the foregoing description the operation of the present spraying apparatus has been set forth in connection with the spraying of trees where the fan is utilized in connection with the air deflectors to produce a high volume, high velocity air blast for carrying the spray mixture to the trees, but it should be recognized that in certain situations the use of an air blast is not required, and is in fact undesirable, as for example in the spraying of grape vines. The present apparatus operates to evenly and effectively spray grape vines and the like without the use of the air blast that is provided by the fan, and when such a spraying operation is to be carried out, the fan 30 may be removed or otherwise disabled so that the spray from the nozzles 38 will be directed toward the vines, but will not be subjected to the usual air blast.

Thus, while preferred embodiments of the invention have been illustrated herein, it is to be understood that changes and variations may be made by those skilled in the art without departing from the spirit and scope of the appending claims.

We claim:

1. In a spraying apparatus, a fan unit having an air outlet through which high velocity carrier air blast is discharged, an air atomization spray nozzle disposed at said outlet in the path of the air blast and having a spray opening discharging in the direction of movement of said carrier air blast, and a constantly driven air compressor, a pressure tank for containing a supply of oil and to which the output of said compressor is supplied to provide a compressed air source and a source of oil under pressure, means connected to said tank for supplying compressed air to the nozzle, a pump for feeding liquid spray to the nozzle under pressure and at a predetermined rate, drive means for said pump and said compressor, and lubricating means for said compressor supplied with oil under pressure from said tank.

2. In a spraying unit for orchards and the like, a tank having vertical front and rear walls, a fan unit mounted on said rear wall and having a cylindrical housing with a rear end air intake and terminating in an outwardly projecting housing wall at its forward end spaced rearwardly from and cooperating with said rear wall of the tank to define a radial air outlet, a fan mounted in said housing and having a fan shaft extended forwardly through said tank, cover plates closing portions of the radial air outlet to limit the air discharge to a selected portion of such outlet, a plurality of rotatable deflector shafts extended across said selected portion of the outlet in spaced relation to each other and parallel to said fan shaft, spray nozzles disposed intermediate at least certain of said deflector shafts, deflector blades fixed on each of said deflector shafts, frame members on said front wall of the tank and having connecting means thereon for supporting the unit on the lifting links of a tractor, means including a drive shaft mounted on said front wall of the tank for feeding spray material from the tank and discharging the same from said nozzles, and a main operating shaft connected to all of the aforesaid shafts for driving the same and adapted to be connected to and driven by the power take-off shaft of a tractor on which the unit is supported.

3. In a spraying unit for orchards and the like, a tank having vertical front and rear walls, a fan unit mounted on said rear wall and having a cylindrical housing with a rear end air intake and terminating in an outwardly projecting housing wall at its forward end spaced rearwardly from and cooperating with said rear wall of the tank to define a radial air outlet, a fan mounted in said housing and having a fan shaft extended forwardly through said tank, cover plates closing portions of the radial air outlet to limit the air discharge to a selected portion of such outlet, a plurality of air deflectors extended across said selected portion of the outlet in spaced relation to each other, means including an operating shaft parallel to said fan shaft for operating said deflectors to vary the direction of said air blast, spray nozzles disposed intermediate at least certain of said deflectors, frame members on said front wall of the tank and having connecting means thereon for supporting the unit on the lifting links of a tractor, means including a drive shaft mounted on said front wall of the tank for feeding spray material from the tank and discharging the same from said nozzles, and a main operating shaft connected to all of the aforesaid shafts for driving the same and adapted to be connected to and driven by the power take-off shaft of a tractor on which the unit is supported.

4. In a spraying unit for orchards and the like, a tank having vertical front and rear walls, a fan unit mounted on said rear wall and having a rear end air intake and a radial air outlet, a fan mounted in said housing and having a fan shaft extended forwardly through said tank, cover plates closing portions of the radial air outlet to limit the air discharge to a selected portion of such outlet, a plurality of movable air deflector plates extended across said selected portion of the outlet in spaced relation to each other and operating means for said deflector plates including an operating shaft, spray nozzles disposed intermediate at least certain of said deflector plates, frame members on said front wall of the tank and having connecting means thereon for supporting the unit on the lifting links of a tractor, means including a drive shaft mounted on said front wall of the tank for feeding spray material from the tank and discharging the same from said nozzles, and a main operating shaft connected to all of the aforesaid shafts for driving the same and adapted to be connected to and driven by the power take-off shaft of a tractor on which the unit is supported.

5. In a mobile spraying unit, a tank having vertical front and rear walls, a fan unit mounted on said rear wall and having a rear end air intake and a radial air outlet, a fan mounted in said housing and having a fan shaft extended forwardly through said tank, cover plates closing portions of the radial air outlet to limit the air discharge to a selected portion of such outlet, a plurality of movable air deflector plates disposed in the path of the air blast in spaced relation to each other and operating means for said deflector plates including an operating shaft, air atomization spray nozzles disposed in the path of the air blast, frame members on said front wall of the tank and having connecting means thereon for supporting the unit on the lifting links of a tractor, positive displacement pump means including a drive shaft mounted on said front wall of the tank for feeding spray material from the tank to said nozzles, an air compressor for supplying compressed air to said nozzles and including a drive shaft, and a main operating shaft connected to all of the aforesaid shafts for driving the same and adapted to be connected to and driven by the power take-off shaft of a tractor on which the unit is supported.

6. In a mobile spraying apparatus, a spray material supply tank and a fan housing permanently associated with each other to provide a unitary assembly, said fan housing providing a rear air intake and a radial air discharge opening from which a high velocity carrier air blast may be discharged, a fan in said housing having forwardly projecting fan shaft, air atomization spray nozzles each having an internal mixing chamber on a spray opening therefrom for discharging spray material into the carrier air blast, a mounting frame on the forward side of the assembly, movable deflector means at the radial air discharge opening for varying the discharge direction of air passing therethrough, means including a drive shaft mounted on the frame for moving said deflector means, positive displacement metering pump means, including a drive shaft, mounted on said frame for feeding spray material from the tank to the mixing chambers of said nozzles, an air compressor, including a drive shaft, and mounted on said frame for supplying pressure air to the mixing chambers of said nozzles, means for directing a portion of the air from said fan onto said compressor for cooling the same, means on the frame for connecting the same to the lifting arms of a tractor, and a main drive on the frame connected to said shafts and adapted to be connected to and driven by the power take-off shaft of such a tractor.

7. In a spraying apparatus, a frame and a wheeled vehicle upon which the frame is mounted, a tank and a fan unit supported on the frame, said fan unit having an air outlet through which high velocity carrier air blast is discharged, a plurality of air atomization spray nozzles disposed in spaced relation at said outlet in the path of the air blast and having a spray opening discharge in the direction of movement of said carrier air blast, means for supplying compressed air to said nozzles, a plurality of positive displacement metering means operated in timed relation to the movement of the vehicle for feeding spray mixture to the nozzles, each of said metering means being allocated to one of said spray nozzles to supply mixture thereto, and means for simultaneously adjusting the output rate of the several metering means, and other means for independently adjusting the output rate of at least certain of said independent metering means to enable spray mixture to be delivered to the several spray nozzles at different rates.

8. In a spraying apparatus, a frame and a wheeled vehicle upon which the frame is mounted, a tank and a fan unit supported on the frame, said fan unit having an air outlet through which high velocity carrier air blast is discharged, a plurality of air atomization spray nozzles disposed in spaced relation at said outlet in the path of the air blast and having a spray opening discharge in the direction of movement of said carrier air blast, means for supplying compressed air to said nozzles, a plurality of positive displacement pumping units operated in timed relation to the movement of the vehicle for feeding spray mixture to the nozzles, each of said pumping units being allocated to one of said spray nozzles, and means for independently adjusting the output rate of said independent pumping units to enable spray mixture to be delivered to the several spray nozzles at different rates.

9. In a spraying apparatus, a frame and a wheeled vehicle upon which the frame is mounted, a tank and a fan unit supported on the frame, said fan unit having an air outlet through which high velocity carrier air blast is discharged, a plurality of air atomization spray nozzles disposed in spaced relation at said outlet in the path of the air blast and having spray openings discharging in the direction of the carrier air blast, means for supplying pressure air to the respective nozzles, and independently adjustable metering means operated in timed relation to the advancing movement of the vehicle for feeding spray mixture to the nozzles at relatively different rates to the respective spray nozzles.

10. In a spraying apparatus, a fan unit having an air outlet through which a high velocity carrier air blast is discharged in the direction of the object to be sprayed, a spray nozzle disposed at said outlet in the path of the carrier air blast, said nozzle having a nozzle body with an internal mixing chamber therein and said body having a spray opening from said chamber through which material may pass from said chamber in said general direction of movement of the air blast, said spray opening being restricted substantially in area as compared with the adjacent portions of said chamber, an air compressor and an associated pressure air tank for providing a source of compressed air at a predetermined pressure, a supply tank for containing highly concentrated spray mixture and having a constantly operating mixing means associated therewith for maintaining the spray mixture in uniformly mixed condition, a volumetric metering pump for feeding spray mixture from the supply tank and discharging such mixture into said mixing chamber at a point remote from said spray opening and at substantially said predetermined pressure, means for feeding compressed air from said pressure air tank and discharging such compressed air at substantially said predetermined pressure for intermixture with the spray mixture at substantially said predetermined pressure within said mixing chamber for sudden expansion upon passing through said spray opening to air-atomize the spray mixture, and constantly shifted vanes in the path of said air blast adjacent said nozzle for producing lateral oscillation of the carrier blast.

11. In a spraying apparatus, a fan unit having an air outlet through which a high velocity carrier air blast is discharged in the direction of the object to be sprayed, a spray nozzle disposed at said outlet in the path of the carrier air blast, said nozzle having a nozzle body with an internal mixing chamber therein and said body having a spray opening from said chamber through which material may pass from said chamber in said general direction of movement of the air blast, said spray opening being restricted substantially in area as compared with the adjacent portions of said chamber, an air compressor and an associated pressure air tank for providing a source of compressed air at a predetermined pressure, a supply tank for containing highly concentrated spray mixture and having a constantly operating mixing means associated therewith for maintaining the spray mixture in uniformly mixed condition, a volumetric metering pump for feeding spray mixture from the supply tank and discharging such mixture into said mixing chamber at a point remote from said spray opening and at substantially said predetermined pressure, means for constantly feeding compressed air from said pressure air tank and discharging such compressed air at substantially said predeterimned pressure for intermixture with the spray mixture at substantially said predetermined pressure within said mixing chamber and for sudden expansion upon passing through said spray opening to air-atomize the spray mixture as it enters said air blast, constantly shifted vanes in the path of said air blast adjacent said nozzle for producing lateral oscillation of the carrier blast, and manually controlled cutoff means for interrupting the feeding of the spray mixture when the spraying action is to be interrupted.

12. In a spraying unit for orchards and the like, a tank having vertical front and rear walls, a fan unit mounted on said rear wall and having a cylindrical housing with a rear end air intake and terminating in an outwardly projecting housing wall at its forward end and spaced rearwardly from and coperating with said rear wall of the tank to define a radial air outlet area, a fan mounted in said housing, means closing portions of the radial air outlet area to confine the air discharge to a final air outlet of limited size, a plurality of shiftable deflector plates extended across said final air outlet in spaced relation to each other, spray nozzles disposed intermediate at least certain of said deflector plates, shifting means for shifting said deflector plates, frame members on said front wall of the tank and having connecting means thereon for supporting the unit on the lifting links of a tractor, means including a drive shaft mounted on said front wall of the tank for feeding spray material from the tank and discharging the same from said nozzles, and a main operating shaft connected in driving relation to said fan and said shifting means for driving the same and adapted to be connected to and driven by the power takeoff shaft of a tractor on which the unit is supported.

References Cited in the file of this patent

UNITED STATES PATENTS

| | | |
|---|---|---|
| 1,989,696 | Kelley | Feb. 5, 1935 |
| 2,012,973 | Parker | Sept. 3, 1935 |
| 2,551,789 | Copley | May 8, 1951 |
| 2,593,096 | Brusdal | Apr. 15, 1952 |
| 2,659,625 | Gramothy | Nov. 17, 1953 |
| 2,674,494 | Matteson et al. | Apr. 6, 1954 |
| 2,707,847 | Anliker | May 10, 1955 |
| 2,757,800 | Kucera | Aug. 7, 1956 |
| 2,768,859 | Patterson | Oct. 30, 1956 |
| 2,886,249 | Sidlow | May 12, 1959 |
| 2,975,543 | Funk | Mar. 21, 1961 |

FOREIGN PATENTS

| | | |
|---|---|---|
| 588,592 | Great Britain | May 28, 1947 |